(No Model.) 4 Sheets—Sheet 1.
D. B. WESSON.
PROCESS OF FORMING DOVETAIL SLOTS IN WOOD.

No. 394,422. Patented Dec. 11, 1888.

Witnesses:
W. S. Bellows.
G. M. Chamberlain.

Inventor.
Daniel B. Wesson,
By his Attorneys Chapin &

(No Model.)  4 Sheets—Sheet 2.

D. B. WESSON.
PROCESS OF FORMING DOVETAIL SLOTS IN WOOD.

No. 394,422.  Patented Dec. 11, 1888.

Fig. 2.

Witnesses.
G. M. Chamberlain.
W. H. Chapin

Inventor,
Daniel B Wesson.
By his Attorneys (No Model.) 4 Sheets—Sheet 3.
D. B. WESSON.
PROCESS OF FORMING DOVETAIL SLOTS IN WOOD.
No. 394,422. Patented Dec. 11, 1888.
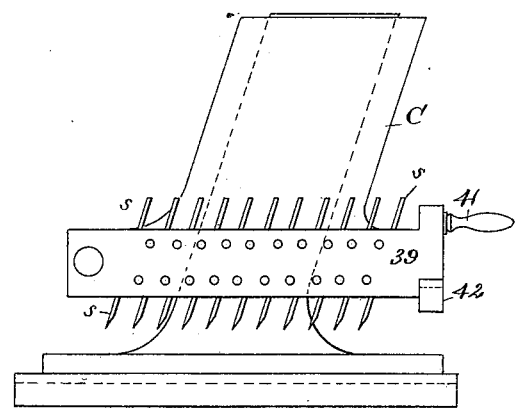
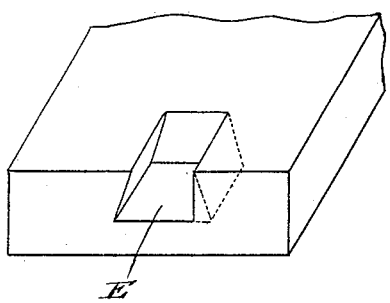
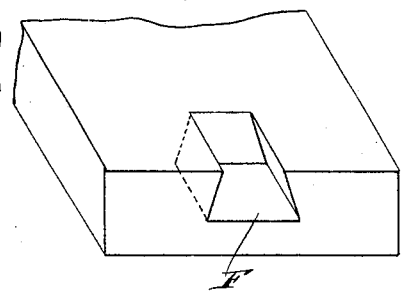
Witnesses.
G. M. Chamberlain
Wm. H. Chapin
Inventor,
Daniel B. Wesson.
By his Attorneys Chapin &

(No Model.) 4 Sheets—Sheet 4.
D. B. WESSON.
PROCESS OF FORMING DOVETAIL SLOTS IN WOOD.
No. 394,422. Patented Dec. 11, 1888.
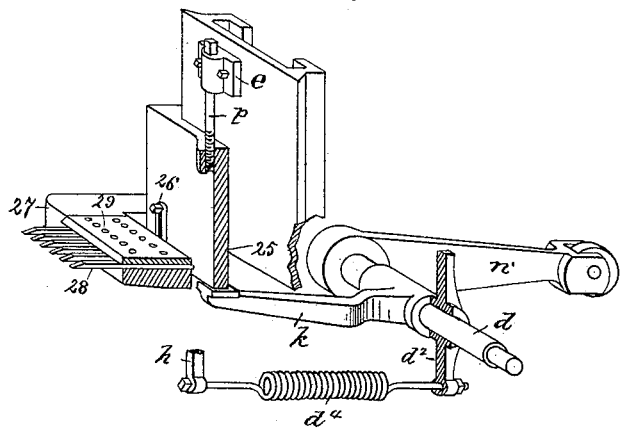
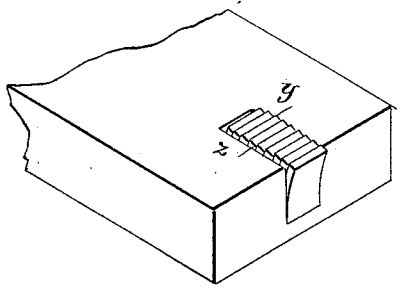
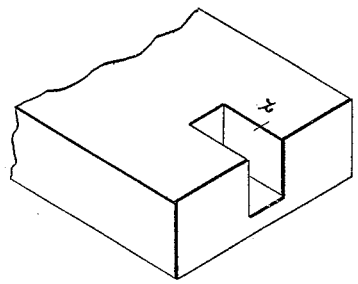

UNITED STATES PATENT OFFICE.

DANIEL B. WESSON, OF SPRINGFIELD, MASSACHUSETTS.

PROCESS OF FORMING DOVETAIL SLOTS IN WOOD.

SPECIFICATION forming part of Letters Patent No. 394,422, dated December 11, 1888.

Application filed December 29, 1887. Serial No. 259,286. (No model.)

*To all whom it may concern:*

Be it known that I, DANIEL B. WESSON, a citizen of the United States, residing at Springfield, in the county of Hampden and State of Massachusetts, have invented certain new and useful Improvements in the Process of Forming Dovetail Slots in Wood; and I do hereby declare that the following is a full, clear, and exact description of the invention, which will enable others skilled in the art to which it appertains to make and use the same.

Heretofore it has been the practice to form dovetail slots in wood by the use of a saw and chisels and by operating to a great extent separately upon each dovetail slot. Under said method of procedure it is difficult, if not impossible, to produce a series of dovetail slots in a piece of wood of uniform dimensions.

The object of my invention is to provide by improved processes or operations to which the wooden parts which are to be united by dovetailing are subjected such means for making the slots thereof as results in the production of perfectly-fitting work.

In carrying my invention into effect I employ a series of machines, which are illustrated in the accompanying drawings, in which—

Figure 1:
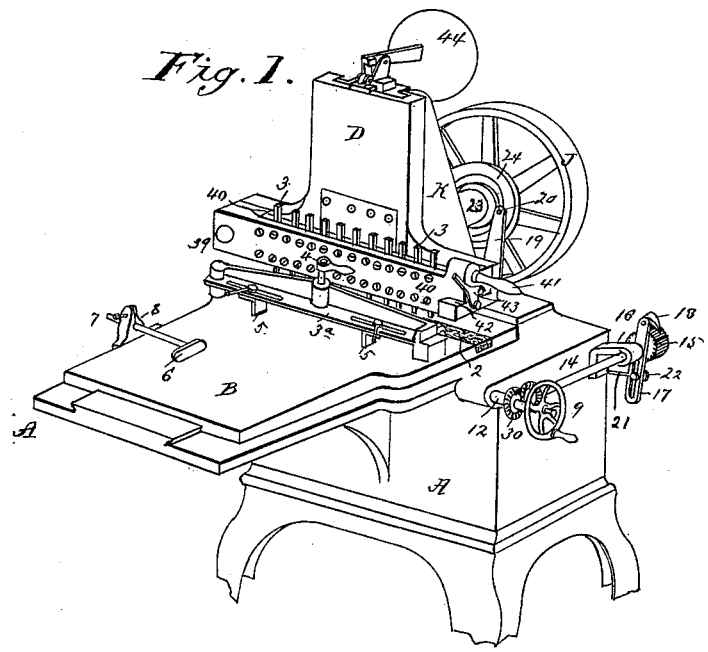

Figure 1 is a perspective view of a machine having secured thereto a series of vertically-acting chisels, and Fig. 2 is a like view of a machine having a series of horizontally-acting chisels attached thereto, said two machines being employed in the earlier steps of the process in making the slots for the dovetails, as below described. Fig. 3 is a front elevation of the cutter-head of a machine having attached thereto a series of chisels employed in succeeding steps in forming said dovetail slots. Fig. 4 is a perspective view, partly in section, of some of the detail parts of the machine shown in Fig. 2. Figs. 5 to 10, inclusive, illustrate in perspective view pieces of wood illustrating the steps in the formation of dovetail slots by the employment of the within-described process.

The first step in the said process of making dovetail slots—that is to say, cutting in the end or piece of a board several parallel-sided slots, one of which slots is shown in each of Figs. 5, 6, and 10—is performed by the use of the machine shown in Fig. 1, whose operation is described below. Fig. 9 illustrates in the slot $z$ therein the appearance of said slot after the operation of the said machine, Fig. 1, thereupon and before the chips or cuttings $y$ made by the action of the chisels of said machine have been removed. Fig. 10 illustrates the appearance of the slot $z$ after the second step in said process or the operation of the machine, Fig. 2, upon the piece coming from said machine, Fig. 1, whereby said chips or cuttings $y$ are removed from said slot.

Figure 5:
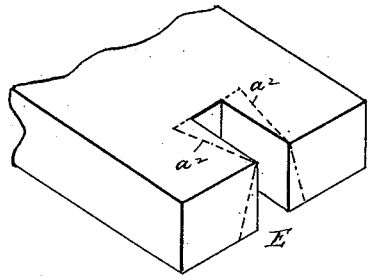

The above-referred-to slots first made by the machine, Fig. 1, in the end of the board are made partially through the board, as in Figs. 9 and 10, or entirely through, as in Fig. 5, according to the kind of dovetail the slot is to receive, the said difference in the slot being effected by the adjustment of the chisels therefor.

Figure 6:
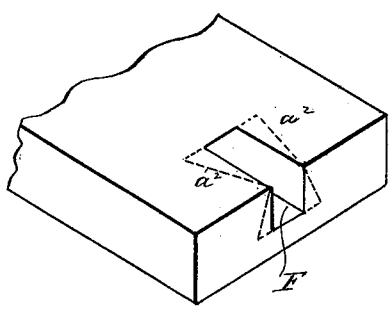

The third step in said process, or undercutting the opposite sides of said slot or slots $z$, whereby each side thereof is given an incline to make the slots wider at one side of the board than at the other, as indicated by dotted lines in Figs. 5 and 6, and fully and partially shown, respectively, in Figs. 8 and 7, is performed by the use of a machine the cutter-head and chisels of which are shown in front elevation in Fig. 3. The dotted lines on the ends only of the blocks, Figs. 5 and 6, indicate cuts to be made to finish the dovetail slots. The lines $a^2$ on said figures indicate the cuts made in making dovetails.

The above-described three steps pertain to the process of making the slots for the dovetails. Said three steps in forming dovetail slots are operated by the employment of the below-described machinery.

In the drawings, referring now to Fig. 1 thereof, A is the bed of the machine. A table, B, has a sliding connection with the bed A by means of a dovetail rib and groove on the upper side of the bed and in the under side of said table, whereby the latter is capable of a longitudinal movement on the bed.

The table B has fixed in its upper surface in a groove running across it a wooden strip, 2, against which the cutters strike while in operation, as below described. A locking-bar, $3^a$, is supported by its ends on the table B, leaving a space between the latter and said bar, so that a board or other piece of wood to be operated on by the machine may be placed between said locking-bar and the table in such way that one end thereof will be brought into proper relation to the cutters or chisels 3. A clamp-screw, 4, is placed in the top of said locking-bar 3ª, having a handle thereon, as shown, whereby said screw is turned against said board which is to be operated upon, thereby holding the latter rigidly in the machine. Two board-guides, 5, are adjustably attached to the under side of said locking-bar by suitable screw-bolts to accommodate the degree of their separation to the width of the board which is to be operated upon. A board-guide, 6, having a shank, 7, thereon, is secured by said shank, which passes through a clamp-block, 8, to the edge of the table B, said clamp-block being suitably bolted to the edge of the table and the said guide 6, being adjustable toward and from the center of the table in order to bring it into line with one of said guides 5 under the locking-bar 3ª. The said table B, when a board is to be secured thereon in which the slots for dovetails are to be cut, is moved away from the cutter-head D by turning the hand-wheel 9, and said board is secured in such position on the table that the cutters or chisels 3 will begin to cut at the end of said board and therefrom inward, or toward the opposite end thereof, and the requisite movement of the table and said board during the operation of cutting said grooves is imparted to it by turning the hand-wheel 9, and thereby turning the shaft 12, which has a pinion thereon under the table B, engaging with a rack on the latter in a well-known manner, said pinion and rack not being shown in the drawings.

If preferred, the table B may be fed automatically while supporting a board under the cutters, by means of the below-described mechanism, which is shown in Fig. 1.

A shaft, 14, is hung in suitable bearings on the side of the bed A, having a beveled geared pinion thereon, which engages with the pinion 30 on the shaft 12. On the rear end of shaft 14 is fixed a ratchet-wheel, 15, and between said ratchet-wheel and the adjoining shaft-support or bearing 16 is hung loosely a pawl-lever, 17, capable of a vibratory movement on the shaft 14 and having a pawl, 18, pivoted to its upper end and capable of engagement with said ratchet-wheel.

A lever, 19, is pivoted in a vertical position on the rear side of the bed A. Said lever 19 has fixed in its upper end a stud, 20, and to its lower end is attached one end of a connecting-rod, 21, and the opposite end of said rod is adjustably connected to one end of said pawl-lever 17, the latter having a longitudinal slot therein through which a screw-stud on the rod 21 passes, and on said screw-stud is a nut, 22, whereby the end of the rod 21 is secured to said pawl-lever at different positions or distances from the end thereof.

The driving-shaft 23 of the machine has a suitable bearing in the fixed head K thereof, said head K being rigidly secured to the bed of the machine in the position shown in Fig. 1, and on said driving-shaft is fixed a grooved cam, 24, in whose groove the said stud 20 on the upper end of lever 19 engages, and on the end of said shaft is fixed a driving-pulley, J. When the machine is in motion, said lever 19 is vibrated and imparts a like motion to the pawl-lever 17, causing the pawl 18 to act upon and impart an intermittent rotary motion to the ratchet-wheel 15 and to the shaft 14, on which said ratchet-wheel is secured, thereby imparting a like intermittent rotary motion to the shaft 12 and a longitudinal motion to the table B of the machine. By swinging the pawl 18 out of engagement with the ratchet-wheel 15 the feed motion of said table ceases.

The head K is rigidly fixed on the bed A of the machine, and the cutter-head D has a vertically-sliding engagement with the head K. The driving-shaft 23 has a bearing in said head K, and has a crank on the end thereof, which engages with the cutter-head D, whereby the latter is given a reciprocating vertical motion.

The cutter-head D is constructed of the form shown in Fig. 1, and has pivoted thereon by one end a cutter-holder, 39, having a clamping-plate, 40, secured to its inner side by screws, as shown, between which and said inner side the cutters 3 are rigidly clamped, suitable grooves to receive the cutters being formed in the inner side of the cutter-holder. A handle, 41, is fixed in the free end of the cutter-holder 39, to provide convenient means for lifting and swinging over the said holder for the purpose of attaching or adjusting the cutters thereon, or to swing them out of the way, so that the work on the table can be seen. The free end of the cutter-holder rests on an arm, 42, on the cutter-head, and is held thereon by a catch-lever, 43, which is pivoted on said arm and has a hook thereon engaging on a pin in the end of the cutter-holder. Said cutter-holder may, if desired, be secured by each end to the head D by a suitable screw-bolt.

A counterbalancing-weight, 44, is attached to the end of a lever which is pivoted to the upper end of the head K, and the opposite end of said lever is attached to the cutter-head. Said weight serves to give steadiness to the reciprocating movement of the cutter-head.

The above-referred-to machine for removing the cuttings or chips from the slots which are formed in the dovetail work by the machine shown in Fig. 1 is, as aforesaid, illustrated in Figs. 2 and 4, and is constructed and operates as follows:

In the drawings, referring to Fig. 2, $w$ is the bed of the machine, having in its upper side several longitudinal grooves in which the heads of bolts are engaged in a well-known way, which serve as means for attaching the block $f$ thereto, said block serving as an abutment for the end of the board which is being operated upon, and preventing said board from sliding endwise away from the cutters.

A locking-bar, P, is pivoted by one end to a block fixed on the bed of the machine, and it extends across the upper surface of the latter, and its opposite end is attached to the edge of the bed by a suitable catch-hook (not shown in the drawings) pivoted to the end of said bar at $x$, whereby one end of said bar may be temporarily disengaged from the edge of the bed, so that the bar may be swung over on its pivoted end from the position shown in Fig. 2 to one which leaves the bed unobstructed in front of the cutters. A clamp-screw, $v$, is placed in said locking-bar, which is screwed against the upper side of a board which is being operated upon by the cutters, the end of said board during said operation being held rigidly under said bar. An edge-gage, $b$, having a shank, $m$, which passes through clamp-jaws $t$, fixed on one edge of the bed, is adjustable toward and from the center of the bed, the edge of said board being brought against said gage when it is adjusted to be operated upon.

A shaft, $j$, is hung in suitable bearings on one end of the machine, and is given a rotary motion by a belt applied to the driving-pulley $g$ thereon, or by other suitable means, said driving-shaft having fixed thereon a cam, 13, and a second cam, $i$, the latter being on the end of said shaft, which projects more or less beyond the side of the machine.

A cutter-head support, 10, is fitted to have a reciprocating motion on the bed of the machine in the direction of the length of the latter, a friction-roll being pivoted in a rearward extension, $c$, of said support, and the aforesaid cam 13 on the driving-shaft has a rotary engagement with said friction-roll, whereby the aforesaid reciprocating motion in one direction is imparted to said support 10. A shaft, $d$, (see Figs. 2 and 4,) hung in suitable bearings in the bed of the machine, is located under said support. A lever, $d^2$, hung on said shaft $d$, has one end engaging with a cross-bar, $d^3$, fixed to the lower side of said support 10, (see Fig. 2,) and the lower end of said lever is connected to a coil-spring, $d^4$, and the opposite end of said spring is connected to a pending arm, $h$, which is fixed under the bed of the machine, a portion of said arm, said spring, and a longitudinal section of said lever $d^2$ being shown in Fig. 4, and the upper end thereof is shown in Fig. 2 through a broken-away side of said support in operative engagement with the said cross-bar $d^3$. The said lever and spring serve to impart to said support 10 a movement toward the shaft $j$, the movement of said support by the cam 13 being made against the force of the spring $d^4$, and the retracting power of the latter serves to move the support in the opposite direction, and thereby the said reciprocating motion is given thereto. The said movement of the support 10, which is imparted to it by the cam 13, is a positive one, and serves to impart a like movement to the cutters of the machine, said spring acting to retire the cutters and retain said support in engagement with said cam.

A lever, $k$, is fixed on the said shaft $d$, the end of which has an engagement with the lower end of the cutter-head 25, as shown in Fig. 4. A lever, $n$, (see Fig. 4,) is fixed by one end to the end of shaft $d$, which projects beyond one side of the bed $w$ and has in its free end a friction-roll, with which the cam $i$ on the driving-shaft $j$ engages, whereby the shaft $d$ is given a rocking motion.

A cutter-head block, $o$, has a sliding engagement with the vertical side $a$ of the cutter-head support 10. A counterbalancing-weight, $q$, is adjustably connected to a lever, 31, which is pivoted on the upper end of the support 10, and one end thereof has a link-connection with said block $a$, as shown in Fig. 2. The cutter-head 25 has a sliding engagement with said block $o$, and is adjustable thereon vertically to provide for adjusting the cutting-edges of the cutters 28 which are carried by said cutter-head, so that they shall cut at a certain distance above the plane of the bed of the machine.

To provide suitable means for adjusting the cutter-head 25 on the block $o$, and for securing the cutter-head thereon when adjusted, an adjusting screw-bolt, $p$, is supported in a box, $e$, on the block $o$, said bolt having a screw engagement with the upper end of the cutter-head, as shown in Fig. 4, and two locking-bolts, 26, pass through slots in the cutter-head and screw into the block $o$, whereby the cutter-head is rigidly secured to said block after adjustment, as aforesaid. The cutter-head is provided with a horizontal projection, 27, extending over the bed of the machine on which are secured the cutters 28, also in a horizontal position, said cutters having chisel-shaped cutting ends, as shown. The cutters 28 are secured on the upper side of said projection 27 by the clamp-plate 29 by means of suitable screws passing through the latter between the cutters into said part 27.

A reciprocating vertical motion is imparted to the cutter-head and to the block $o$ by the vibratory motions of the lever $k$, which is fixed on the rocking shaft $d$, the end of said lever engaging, as aforesaid, with the lower end of the cutter-head, whereby the latter is given an upward motion and the return movement of the cutter-head is by gravity. The said counterbalancing-weight $q$, having a connection with the sliding block $o$, is so adjusted on the lever 31 as to cause the upward and downward movement of the cutter-head to be rendered easy and free from any shock that might result in case the lever $k$ was depended upon alone to lift the cutter-head, and also to prevent a too sudden drop of the cutter-head when the end of lever $k$ moves downward.

The operation of the above-described machine in removing said chips or cuttings is as follows: The pieces of lumber or board to be operated upon have their dovetail slots $z$ formed to the extent illustrated in Fig. 9, wherein the chips or cuttings $y$ are left as there indicated, and the boards in that condition are placed upon the bed $w$ of the machine with their partially-slotted ends secured under the locking-bar P and in proximity to the ends of the cutters 28, the latter being so adjusted that they will cut on the line of the bottom of the groove $z$, there being in practice as many cutters secured to the cutter-head to operate on said grooves as there are of the latter. The board having been adjusted to its position on the bed, the machine is set in motion and the cutters first move horizontally, carried by the horizontal motion of the support 10 and the cutter-head, which is imparted thereto by the cam 13, and enter the slots under the chips $y$, and at the end of said horizontal movement the cam $i$ on the driving-shaft engages with the end of lever $n$, thereby rocking the shaft $d$ and giving an upward motion to the end of the lever $k$, whereby the cutter-head and cutters are moved upward, thereby lifting the chips $y$ out of the grooves $z$.

By means of the above-described action of the cutters which have, as set forth, a reciprocating horizontal and vertical movement the slots $z$ are quickly cleared of the chips $y$ and are brought to the condition of the slot shown in Fig. 10, and are then ready for the succeeding operation of having their opposite vertical sides cut to the proper incline to receive the dovetail.

For cutting the opposite sides of the slots E and F to give them the inclined forms shown in Fig. 8, and in dotted lines in Figs. 5 and 6, machines are constructed having a cutter-head, C, and cutters $s$, as shown in Fig. 3, which have reciprocating motions in a line at such an incline as it is desired to cut on the sides of said slots, and said machine is organized to have a suitable cross-feed motion given to said cutter-head and cutters while said inclined sides are being cut.

In practice three separate machines are employed for completely forming the slots E and F, one for producing them in the form shown in Fig. 6 and one for cutting each inclined side thereof, with cutters and cutter-head reversely inclined, as illustrated in Fig. 3. Slots, as E and F, Figs. 5 and 6, of varying depths (one being quite and the other partially through the board) are produced by adjusting the lower ends of the cutters 3, Fig. 1, at different distances from the table B.

By the practice of the above-described process for making slots in wood for the reception of dovetails each step of the process is performed simultaneously upon all of the slots in the piece, thereby insuring such accuracy in their formation and relative positions as serves to result in perfect work.

Certain of the above-described steps in the formation of dovetail slots are performed in making the dovetails for said slots; but the process for making said dovetails constitutes no part of the invention which forms the subject-matter of this application, the process for making said dovetails forming the subject-matter of another application.

Having fully described my invention, what I desire to claim and secure by Letters Patent is—

The process of making slots for dovetails in wood structures, consisting of the following steps, viz: first, cutting in a piece of wood, at one operation, by a series of cutters having a movement at right angles to the plane of said piece, parallel-sided slots; second, removing the cuttings simultaneously from all of said slots by a series of cutters having a reciprocating movement in the direction of the length and depth of said slots, and, third, undercutting, at one operation and at an incline to the plane of said piece, first one side and then the opposite side of said slots, by cutters having a reciprocating motion at an incline, reversely to a line at right angles to the plane of said piece, thereby completing the same for the reception of dovetails therein.

DANIEL B. WESSON.

Witnesses:
WM. S. BELLOWS,
H. A. CHAPIN.